United States Patent
Adachi et al.

(10) Patent No.: US 8,712,671 B2
(45) Date of Patent: Apr. 29, 2014

(54) ENGINE RPM CONTROL DEVICE

(75) Inventors: Hitoshi Adachi, Osaka (JP); Takeshi Takahashi, Osaka (JP); Isao Takagawa, Osaka (JP)

(73) Assignee: Yanmar Co., Ltd., Osaka (JP)

(*) Notice: Subject to any disclaimer, the term of this patent is extended or adjusted under 35 U.S.C. 154(b) by 538 days.

(21) Appl. No.: 13/124,520

(22) PCT Filed: Oct. 7, 2009

(86) PCT No.: PCT/JP2009/067454
§ 371 (c)(1),
(2), (4) Date: Apr. 15, 2011

(87) PCT Pub. No.: WO2010/044359
PCT Pub. Date: Apr. 22, 2010

(65) Prior Publication Data
US 2011/0202261 A1 Aug. 18, 2011

(30) Foreign Application Priority Data
Oct. 16, 2008 (JP) ................................. 2008-267658

(51) Int. Cl.
*F02D 41/00* (2006.01)
*F02D 41/30* (2006.01)

(52) U.S. Cl.
USPC ........................................................ 701/104

(58) Field of Classification Search
USPC .......... 701/101, 102, 104; 123/350, 352, 359, 123/493; 73/114.25, 114.36
See application file for complete search history.

(56) References Cited

U.S. PATENT DOCUMENTS

| 5,936,152 A * | 8/1999 | Nishioka et al. ............ 73/114.25 |
| 7,082,936 B2 * | 8/2006 | Sakaguchi et al. ............ 123/399 |
| 2004/0002808 A1 | 1/2004 | Hashimoto et al. |
| 2007/0225892 A1 | 9/2007 | Yasui et al. |

FOREIGN PATENT DOCUMENTS

| JP | 02-301640 A | 12/1990 |
| JP | 2689119 B2 | 8/1997 |
| JP | 2689119 B2 | 12/1997 |
| JP | 2000-179363 | 6/2000 |

(Continued)

OTHER PUBLICATIONS

Notice of Reasons for Refusal for related Japanese Appl. No. 2008-267658, Japanese Patent Office, mailed Sep. 11, 2012, 6 pgs.

(Continued)

*Primary Examiner* — Hieu T Vo
(74) *Attorney, Agent, or Firm* — Sterne, Kessler, Goldstein & Fox P.L.L.C.

(57) ABSTRACT

Provided is an engine rpm control device which gradually reduces the output speed of an engine drive object when reducing the engine rpm. The engine rpm control device (20) includes a target engine rpm correction means used upon detection of an engine failure. The target engine rpm correction means has a storage device (51) containing a map of the correlation characteristic between the engine rpm and the output speed of object to be driven by an engine (100). The target engine rpm correction means corrects the target engine rpm so that an instructed engine rpm (Nset) or a derating target engine rpm (Nset') is shifted to a predetermined failure-preventing engine rpm (N2) while maintaining the reduction ratio of the output speed of the drive object at a predetermined ratio.

2 Claims, 4 Drawing Sheets

(56) References Cited

FOREIGN PATENT DOCUMENTS

| JP | 2003-254137 A | 9/2003 |
|----|---------------|--------|
| JP | 2004-027985 A | 1/2004 |
| JP | 2005-315161 A | 11/2005 |
| JP | 2008-190389   | 8/2008 |

OTHER PUBLICATIONS

International Search Report for PCT/JP2009/067454, Japanese Patent Office, mailed Nov. 24, 2009, 2 pages.

* cited by examiner

ENGINE RPM CONTROL DEVICE

TECHNICAL FIELD

The present invention relates to an art of an engine rotation speed control device having a means for correcting target engine rotation speeds at the time of detecting engine abnormality.

BACKGROUND ART

Conventionally, an engine rotation speed control device is known which has a control means reducing a target engine rotation, speed for the safety. For example, the Patent Literature 1 discloses a rotation control device of a diesel engine for a ship which reduces a fuel injection amount so as to reduce a target engine rotation speed in the case that a command engine rotation speed by a control lever in abnormality detection mode is equal to or more than a predetermined value and an actual engine rotation speed is equal to or more than the predetermined value.

In the rotation control device of the diesel engine for the ship disclosed in, the Patent Literature 1, an object to be controlled, is the engine rotation speed. Therefore, in the case that the reduction tendency of the ship speed itself is not necessarily in agreement with that of the engine rotation speed, an operator cannot feel softly the deceleration at the time of detecting the abnormality of the engine. In other words, in an engine rotation speed control device having a control means for reducing the target engine rotation speed for the safety, in the case that reduction tendency of an output speed of an object driven by the engine is not in agreement with that of the engine rotation speed, an operator cannot feel softly the deceleration at the time of detecting the abnormality of the engine.

Patent Literature 1: the Japanese Patent No. 2689119

DISCLOSURE OF INVENTION

Problems to Be Solved by the Invention

The purpose of the present invention is to provide an engine rotation speed control device which gradually reduces the output speed of an object driven by an engine when the engine rotation speed is reduced.

Means for Solving the Problems

An engine rotation speed control device of the present invention has an actual engine rotation speed detection means, a target engine rotation speed command means, a means for calculating a fuel injection amount based on an actual engine rotation speed and a target engine rotation speed, an engine abnormality detection means, and a means for correcting the target engine rotation speed at the time of detecting engine abnormality. The means for correcting the target engine rotation speed at the time of detecting the engine abnormality has a storage unit. The target engine rotation speed is corrected so as to make the target engine rotation speed shift to a predetermined abnormality aversion engine rotation speed based on a map of correlation characteristic between the actual engine rotation speed and an output speed of an object driven by the engine stored in the storage unit while a deceleration rate of the output speed of the object is held at a predetermined value.

In the engine rotation speed control device of the present invention, the target engine rotation speed is corrected so as to make the target engine rotation speed shift to a predetermined abnormality aversion engine rotation speed while the deceleration rate of the output speed of the object is increased with time from the start of the deceleration to the finish of the deceleration.

The engine rotation speed control device of the present invention has a selection means selecting one of controls, i.e., the control in which the target engine rotation speed is corrected so as to make the target engine rotation speed shift to a predetermined abnormality aversion engine rotation speed while the deceleration rate of the output speed of the object driven by the engine is held at a predetermined value, and the control in which the target engine rotation speed is corrected so as to make the target engine rotation speed shift to a predetermined abnormality aversion engine rotation speed while the deceleration rate of the output speed of the object is increased with time from the start of the deceleration to the finish of the deceleration based on the correlation characteristic between the engine rotation speed and an output speed of the object.

Effect of the Invention

According to the engine rotation speed control device of the present invention, at the time of detecting the engine abnormality, the output speed itself of the object driven by the engine is reduced while the deceleration rate is held at a predetermined value, whereby an operator feels softly the deceleration at the time of detecting the abnormality of the engine.

According to the engine rotation speed control device of the present invention, at the time of detecting the engine abnormality, the output speed itself of the object driven by the engine is reduced while the deceleration rate is increased with time, whereby an operator feels softly the deceleration at the time of detecting the abnormality of the engine.

According to the engine rotation speed control device of the present invention, at the time of detecting the engine abnormality, the output speed itself of the object driven by the engine is reduced while the deceleration rate is held at a predetermined value, or reduced while the deceleration rate is increased with time, whereby an operator feels softly the deceleration at the time of detecting the abnormality of the engine. Furthermore, the operator can optionally select the deceleration rate characteristics of the output speed at the time of detecting the abnormality of the engine.

DESCRIPTION OF NOTATIONS

Figure 1:
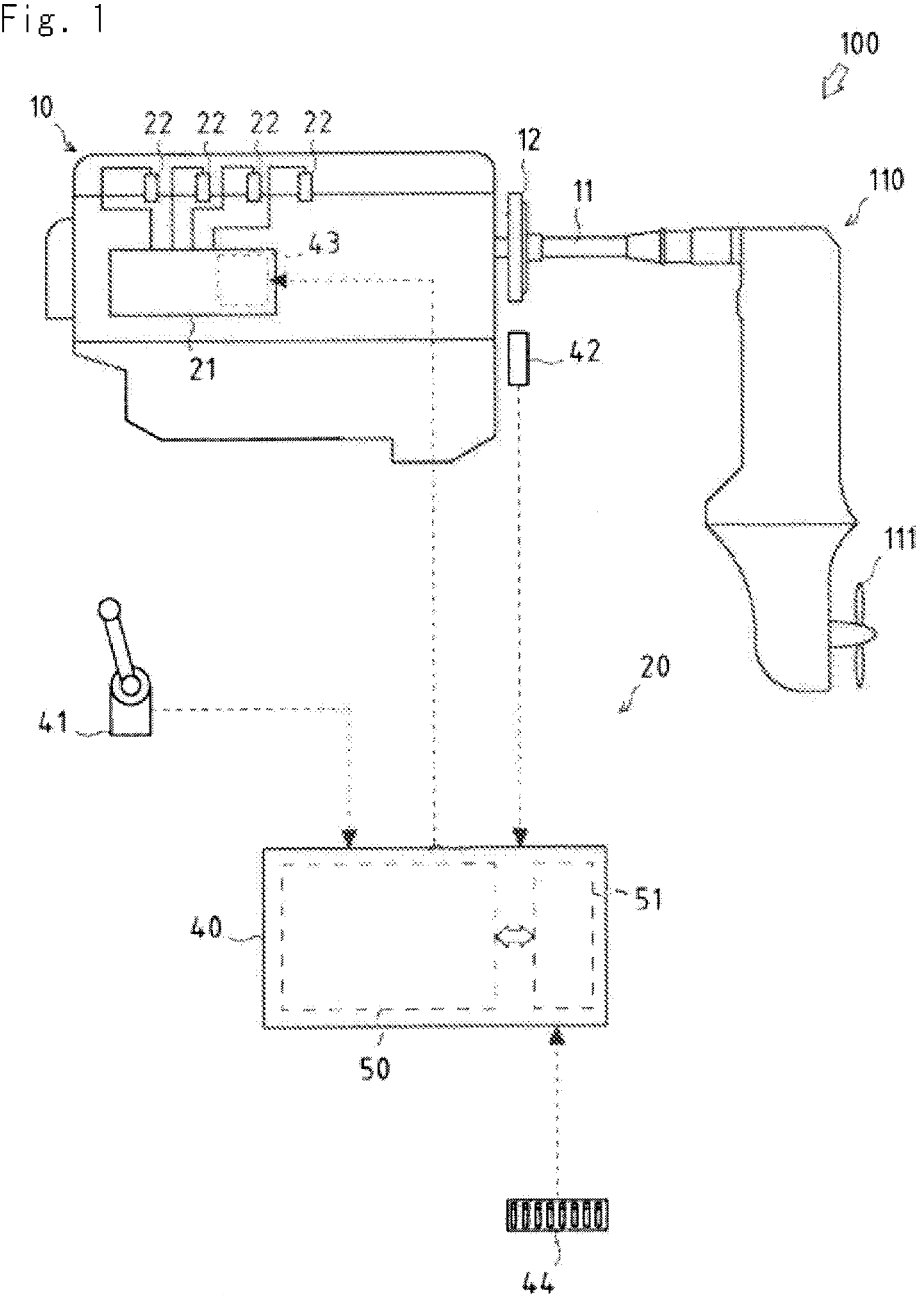
FIG. 1 It is a schematic drawing of an engine according to an embodiment of the present invention.

10 engine body
20 engine rotation speed control device
40 ECU
41 accelerator
42 engine rotation speed sensor
44 setting unit
50 arithmetical unit 51 storage unit
61 Vs calculation unit
62 abnormality detection unit
63 Vset pattern generation part
64 Nset' calculation unit
65 Nset switch unit
66 injection amount calculation unit
100 engine
Vs ship speed
Vset target ship speed
Nset command engine rotation speed
Nset' derating target engine rotation speed
N2 abnormality aversion engine rotation speed
P1 first Vset pattern
P2 second Vset pattern

BEST MODE FOR CARRYING OUT THE INVENTION

Next, explanation will be given on the mode for carrying out the present invention.

Figure 2:
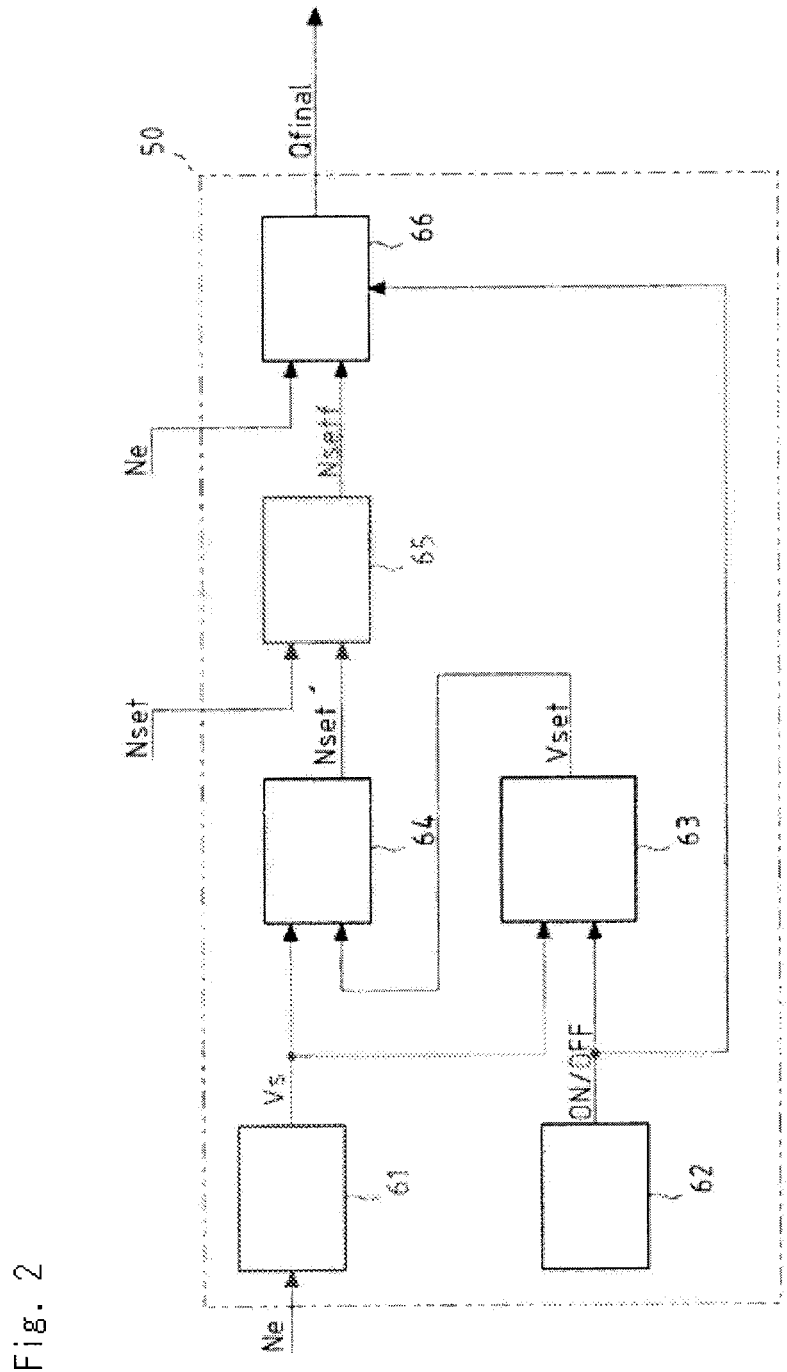
FIG. 2 It is a block diagram of signal transmission of derating control of the engine.
Figure 3:
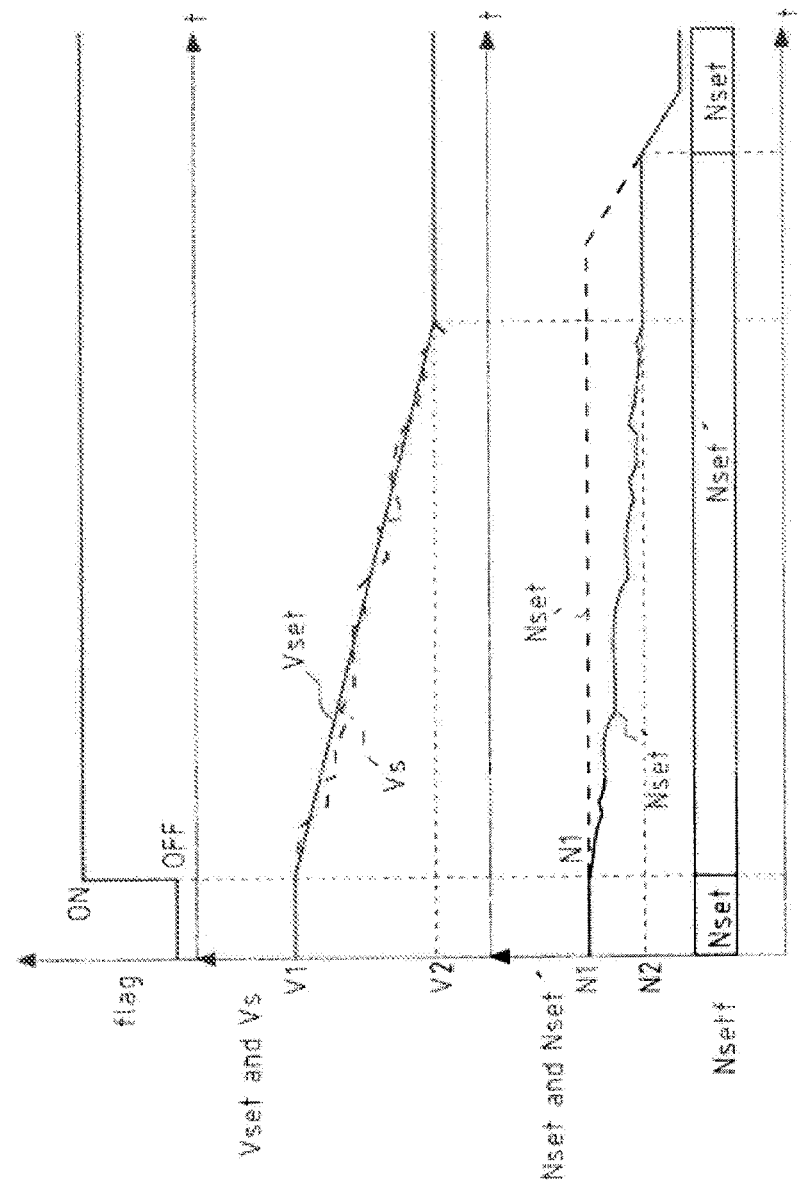
FIG. 3 It is a graph of transition of an embodiment 1 of the derating control of the engine.
Figure 4:
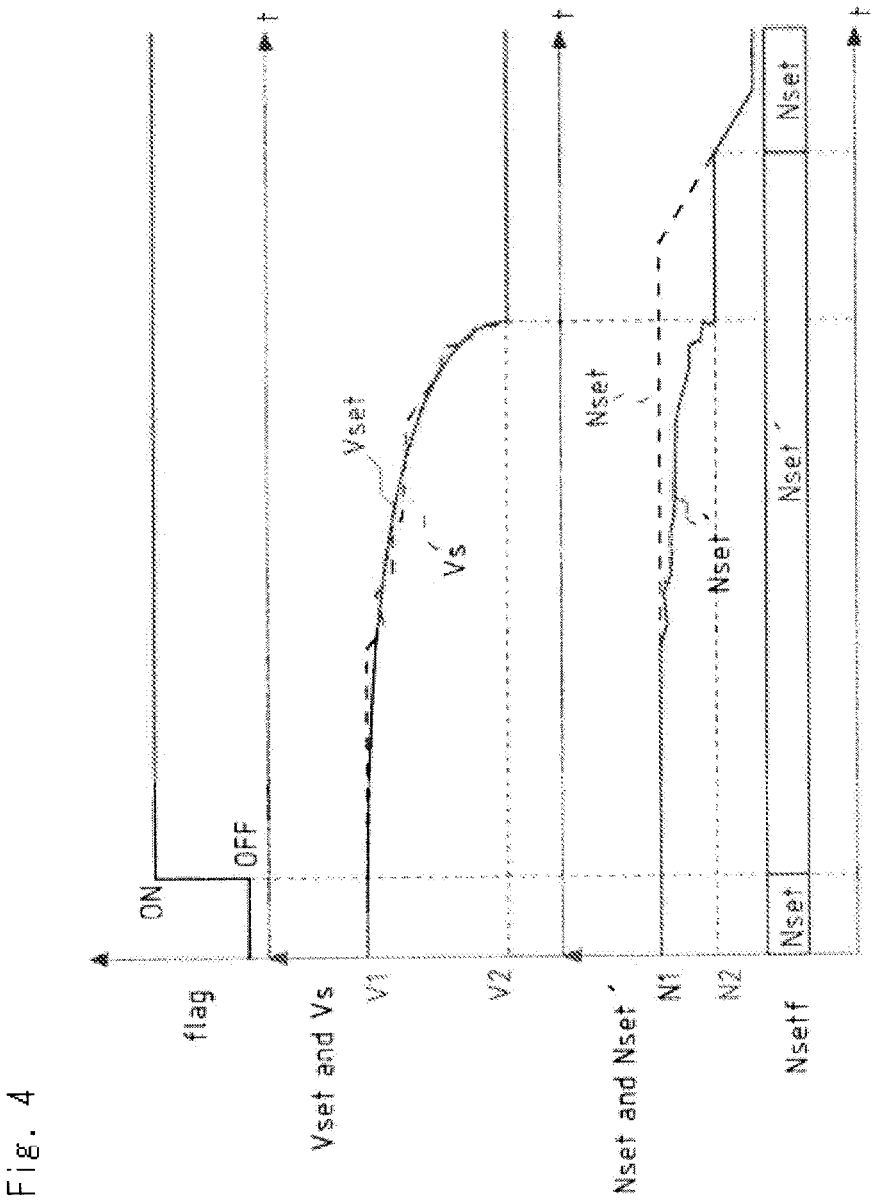
FIG. 4 It is a graph of transition of an embodiment 2 of the derating control of the engine.

FIG. 1 is a schematic drawing of an engine according to an embodiment of the present invention. FIG. 2 is a block diagram of signal transmission of derating control of the engine. FIG. 3 is a graph showing the transition of an embodiment 1 of the derating control. FIG. 4 is a graph showing the transition of an embodiment 2 of the derating control.

Explanation will be given on an engine 100 which is an embodiment of the present invention. The engine 100 is a direct injection type 4-cylindered engine which drives a propulsion unit 110 as a marine engine mounted on a ship. The engine 100 has an engine body 10 and an engine rotation speed control device 20.

An output shaft 11 of the engine 100 is connected to the propulsion unit 110. A flywheel 12 is provided on the output shaft 11 of the engine 100. The propulsion unit 110 drives a propeller 111 by the drive of the output shaft 11.

The engine body 10 has a fuel injection pump 21 and four injectors 22. Fuel is pressingly sent by the fuel injection pump 21 and injected into cylinders through the injectors 22. The fuel injection pump 21 is controlled in the injection amount by an electronic governor mechanism including a rack actuator 43.

The engine rotation speed control device 20 performs control in which target engine rotation speed is reduced at the time of detecting engine abnormality (hereinafter, referred to as derating control). The engine rotation speed control device 20 is constructed by connecting an engine control unit (hereinafter, referred to as ECU) 40, an accelerator 41, an engine rotation speed sensor 42, the rack actuator 43 and a setting unit 44.

The ECU 40 has an arithmetical unit 50 and a storage unit 51. The accelerator 41 is provided in an operator's seat of a ship. The accelerator 41 has a function for commanding the ECU 40 a command engine rotation speed Nset as a target engine rotation speed command means. The engine rotation speed sensor 42 is provided near the flywheel 12. The engine rotation speed sensor 42 has a function for detecting an actual engine rotation speed Ne and transmitting it to the ECU 40 as an actual engine rotation speed detection means. The rack actuator 43 controls a fuel injection amount based on a final target injection amount Qfinal calculated by an injection amount calculation unit 66 discussed later. The setting unit 44 has a function for selecting or setting various functions of the engine 100 as a selection means.

Explanation will be given on signal transmission of derating control referring to FIG. 2. The arithmetical unit 50 has functions as a Vs calculation unit 61, an abnormality detection unit 62, a Vset pattern generation part 63, a Nset' calculation unit 64, a Nset switch unit 65 and the injection amount calculation unit 66.

The Vs calculation unit 61 has a function for converting the actual engine rotation speed Ne transmitted from the engine rotation speed sensor 42 into a ship speed Vs so as to calculate the ship speed Vs. The correlation characteristic between the actual engine rotation speed Ne and the ship speed Vs as the correlation characteristic between engine rotation speed and output speed of an object driven by the engine is previously set in the storage unit 51 as a map. Instead of employing the Vs calculation unit 61, the actual position of the ship may be grasped with a GPS so as to calculate the ship speed Vs. The ship speed Vs may be calculated from resistance of water at the time of sailing.

The abnormality detection unit 62 has a function as an engine abnormality detection means. More concretely, the abnormality detection unit 62 has a function for transmitting a signal of ON/OFF of a derating requirement flag to the Vset pattern generation part 63 and the injection amount calculation unit 66 when the abnormality of the engine 100 is detected. The abnormality of the engine 100 is the case that the ECU 40 recognizes the abnormal state in which temperature of cooling water of the engine 100 becomes larger than a set value or pressure of lubricating oil of the engine 100 becomes larger than a set value, for example.

The Vset pattern generation part 63, the Nset' calculation unit 64 and the Nset switch unit 65 have a function as a means for correcting target engine rotation speed in the case that the abnormality of the engine is detected.

More concretely, the Vset pattern generation part 63 has a function for calculating a target ship speed Vset from the state of ON/OFF of the derating requirement flag and the actual ship speed Vs based on a Vset pattern. The details of the Vset pattern will be described later.

The Nset' calculation unit 64 has a function for calculating a derating target engine rotation speed Nset' so as to make deflection between the ship speed Vs and the target ship speed Vset be zero.

The Nset switch unit 65 has a function for selecting the derating target engine rotation speed Nset' or the command engine rotation speed Nset as a final target engine rotation speed Nsetf based on the state of ON/OFF of the derating requirement flag. More concretely, the Nset switch unit 65 selects the derating target engine rotation speed Nset' as the final target engine rotation speed Nsetf when the derating requirement flag is set, and selects the command engine rotation speed Nset as the final target engine rotation speed Nsetf when the derating requirement flag is cleared.

The injection amount calculation unit 66 has a function as a fuel injection amount calculation means. More concretely, the injection amount calculation unit 66 has a function for calculating the final target injection amount Qfinal so as to make deflection between the final target engine rotation speed Nsetf and the actual engine rotation speed Ne transmitted from the engine rotation speed sensor 42 be zero.

Embodiment 1

Explanation will be given on an embodiment 1 of the derating control referring to FIG. 3. In FIG. 3, the axis of abscissas indicates the time (t). In the axis of ordinates, the upper portion indicates the state of ON/OFF of the derating requirement flag, the middle portion indicates the target ship speed Vset (a solid line in the graph) and the ship speed Vs (a broken line in the graph), and the lower portion indicates the command engine rotation speed Nset (a broken line in the graph) and the derating target engine rotation speed Nset' (a solid line in the graph). The lower portion indicates the derating target engine rotation speed Nset' or the command engine rotation speed Nset selected as the final target engine rotation speed Nsetf.

In FIG. 3, the target ship speed Vset at the time that the state of ON of the derating requirement flag is transmitted is defined as an initial ship speed V1, and the command engine rotation speed Nset at the time that the state of ON of the derating requirement flag is transmitted is defined as an initial engine rotation speed N1. Furthermore, an engine rotation speed which is the final target of the derating control is defined as an abnormality aversion engine rotation speed N2, and the ship speed corresponding to the abnormality aversion engine rotation speed N2 is defined as an abnormality aversion ship speed V2.

In a first Vset pattern P1 of the embodiment 1, the ship speed is shifted from the initial ship speed V1 toward the abnormality aversion ship speed V2 while the deceleration rate of the target ship speed Vset is held at a predetermined value. The Vset pattern P1 is previously stored in the storage unit 51 of the ECU 40 as a map.

In the embodiment 1, when the state of ON of the derating requirement flag is transmitted, the target ship speed Vset of the deceleration from the initial ship speed V1 to the abnormality aversion ship speed V2 with the predetermined deceleration rate is calculated, and the derating target engine rotation speed Nset' corresponding to this target ship speed Vset is calculated.

Accordingly, at the time of detecting the abnormality of the engine 100, the ship speed Vs itself of an object driven by the engine 100 is decelerated with the predetermined deceleration rate, whereby an operator feels softly the deceleration at the time of detecting the abnormality of the engine.

Embodiment 2

Explanation will be given on an embodiment 2 of the derating control referring to FIG. 4. In FIG. 4, what the axis of abscissas and the axis of ordinates indicate is the same as that of FIG. 3 and explanation thereof is omitted. The initial ship speed V1, the abnormality aversion ship speed V2, the initial engine rotation speed N1 and the abnormality aversion engine rotation speed N2 are defined similarly to the embodiment 1.

In a second Vset pattern P2 of the embodiment 2, the ship speed is shifted from the initial ship speed V1 toward the abnormality aversion ship speed V2 while the deceleration rate of the target ship speed Vset is increased with time. The Vset pattern P2 is previously stored in the storage unit 51 of the ECU 40 as a map.

In the embodiment 2, when the state of ON of the derating requirement flag is transmitted, the target ship speed Vset of the deceleration from the initial ship speed. V1 to the abnormality aversion ship speed V2 with the deceleration rate increased with time is calculated, and the derating target engine rotation speed Nset' corresponding to this target ship speed Vset is calculated.

Accordingly, at the time of detecting the abnormality of the engine 100, the ship speed Vs itself of the ship which is an object driven by the engine 100 is decelerated with the deceleration rate increased with time, whereby an operator feels softly the deceleration at the time of detecting the abnormality of the engine.

The state is conceivable that an operator senses the engine abnormality in the derating control and operates the accelerator 41 so as to perform reduction operation and obtain a target engine rotation speed smaller than the abnormality aversion engine rotation speed N2.

Therefore, in the embodiments 1 and 2, when the accelerator 41 is operated in the derating control and the command engine rotation speed Nset becomes smaller than the abnormality aversion engine rotation speed N2, the final target engine rotation speed Nsetf is returned to the command engine rotation speed Nset. The command engine rotation speed Nset is not permitted to be larger than, the abnormality aversion engine rotation speed N2.

Accordingly, after the reduction by the derating control, the operation of the accelerator 41 can be made effective, whereby the operability of the ship is improved.

Embodiment 3

Furthermore, explanation will be given on an embodiment 3 of the derating control. In the Vset pattern of the embodiment 3, an operator can select optionally one of the Vset pattern P1 and the second Vset pattern P2 with the setting unit 44.

Accordingly, at the time of detecting the abnormality of the engine 100, the operator can select optionally the deceleration rate characteristic of the ship speed Vs of the ship which is an object driven by the engine 100, whereby the operability of the ship is improved.

The engine control according to the present invention can be employed effectively in not only an engine of a ship but also an engine in which engine rotation speed is reduced automatically at the time of detecting abnormality.

INDUSTRIAL APPLICABILITY

According to the engine rotation speed control device of the present invention, an operator feels softly the deceleration at the time of detecting the abnormality of the engine, whereby the invention is useful industrially.

The invention claimed is:

1. An engine rotation speed control device comprising:
 an actual engine rotation speed detection means;
 a target engine rotation speed command means;
 a means for calculating a fuel injection amount based on an actual engine rotation speed and a target engine rotation speed;
 an engine abnormality detection means; and
 a means for correcting the target engine rotation speed at the time of detecting engine abnormality,
 characterized in that:
 the means for correcting the target engine rotation speed at the time of detecting the engine abnormality has a storage unit, and
 the target engine rotation speed is corrected so as to make the target engine rotation speed shift to a predetermined abnormality aversion engine rotation speed based on a map of correlation characteristic between the actual engine rotation speed and an output speed of an object driven by the engine stored in the storage unit while a deceleration rate of the output speed of the object is increased with time from the start of the deceleration to the finish of the deceleration.

2. The engine rotation speed control device according to claim 1, further comprising:
 a selection means for selecting one of:
 the control in which the target engine rotation speed is corrected so as to make the target engine rotation speed shift to a predetermined abnormality aversion engine rotation speed while the deceleration rate of the output speed of the object driven by the engine is held at a predetermined value, and the control in which the target engine rotation speed is corrected so as to make the target engine rotation speed shift to a predetermined abnormality aversion engine rotation speed while the deceleration rate of the output speed of the object is increased with time from the start of the deceleration to the finish of the deceleration based on the correlation characteristic between the engine rotation speed and an output speed of the object.

\* \* \* \* \*